United States Patent [19]

Dazey et al.

[11] Patent Number: 5,715,415
[45] Date of Patent: Feb. 3, 1998

[54] COMPUTER APPLICATION WITH HELP PANE INTEGRATED INTO WORKSPACE

[75] Inventors: Byron Dazey, Woodinville; Christopher R. Jones; Paul C. Elliott, both of Seattle, all of Wash.

[73] Assignee: Microsoft Corporation, Redmond, Wash.

[21] Appl. No.: 660,696

[22] Filed: Jun. 5, 1996

[51] Int. Cl.⁶ ...................................................... G06F 3/00
[52] U.S. Cl. ............................................................ 395/338
[58] Field of Search ................................ 395/336, 338, 395/337

[56] References Cited

U.S. PATENT DOCUMENTS

| | | | |
|---|---|---|---|
| 4,789,962 | 12/1988 | Berry et al. | 395/338 |
| 5,157,768 | 10/1992 | Hoeber et al. | 395/338 |
| 5,179,654 | 1/1993 | Richards et al. | 395/338 |
| 5,287,448 | 2/1994 | Nicol et al. | 395/338 X |
| 5,471,575 | 11/1995 | Giansante | 395/338 X |
| 5,481,667 | 1/1996 | Bieniek et al. | 395/338 |

Primary Examiner—Raymond J. Bayerl
Assistant Examiner—A. Katbab
Attorney, Agent, or Firm—Lee & Hayes, PLLC

[57] ABSTRACT

A computing device has a processor, a display, and an operating system which executes on the processor to provide a graphical user interface environment capable of presenting graphical windows on the display. A computer application runs on the operating system and is presented within a graphical application window of the graphical user interface. The computer application is configured to present a help pane for showing help content to a user without requiring the user to open a separate graphical window to show the help content. The help pane is positioned adjacent to a workspace to assist the user with context specific, step-by-step, instructions. When the help pane is active, the focus remains on the application and on the work being performed in the workspace, as opposed to being transferred to the help pane. As a result, the user can directly implement the instructions provided in the help pane without having to remember to switch the focus between the help and application, as is required when separate help windows are used.

34 Claims, 5 Drawing Sheets

COMPUTER APPLICATION WITH HELP PANE INTEGRATED INTO WORKSPACE

TECHNICAL FIELD

This invention relates to computers and applications that run on them. More particularly, this invention relates to computer-implemented methods for offering helpful instructions to users during execution of the applications.

BACKGROUND OF THE INVENTION

Computer users are familiar with electronic help options that are available with most computer applications. In a windows operating environment, the user initiates the help option through a menu option or a special soft button that timely appears during certain events. Upon activation, the application opens a separate graphical help window which is overlaid on the present application window. The help window lists instructions to assist the user in performing a task.

In some applications, the help window is configured to act as other active windows. When the help window is active, it appears on top of other windows. When another window is active, however, the help window is layered and hidden behind the active window.

This type of help window has a drawback in that the user can easily lose track of it. The window can be partially or completely hidden behind other windows. Additionally, this approach is awkward because the user must toggle between the help window, where the help tips are shown, and the application window, where the user performs the task. As a result of this hassle, the user often does not bother to use the help feature.

To alleviate this problem of hidden help windows, some applications have been configured to "float" the separate help window atop other windows. In this manner, the help window always remains above other windows and hence, in view for the user. The drawback with this approach is that the floating help window often rests above the workspace, covering the present work. The user is forced to move the help window around the display, re-size the workspace, and/or re-size the help window. Again, to avoid the trouble, the user often elects not to call the help option.

Another problem experienced by users is that the separate help window causes loss of focus and attention to the primary window. A window is said to have "focus" when it is active and currently designated to receive the user input from the keyboard or mouse. To navigate in a help window, the help option is activated and focus is transferred from the application window to the help window. This shift of focus makes it confusing for the user to implement the help instructions. As the user attempts to follow the simple directions for a help topic, the efforts are not effective because the keystrokes referenced in the help window are only valid when the application window has the focus.

At best, a savvy user is forced to click on the help window to bring it to the foreground (and thereby transfer focus to that window) and read the first few steps. Then, the user must remember to click on the application window to return focus to the application window so that the user may implement the first few steps. Needing more help, the user again clicks on the help window, scrolls the help topic to see the next series of steps, and then clicks back on the application window to perform the steps. This process of actively switching focus between two windows is repeated until the task is completed. During this cycle, users often forget to click back on the application window, or when they do, they might unintentionally change the selection state in the application if they unexpectedly click at the wrong place, thereby invalidating the steps that had been previously performed.

In view the these drawbacks, there is a need to improve the techniques for offering helpful assistance to computer users.

SUMMARY OF THE INVENTION

This invention provides a new technique for offering help content to a computer user who operates a computer application in a graphical user interface windowing environment. The computer application is opened into a graphical window through normal practice (i.e., clicking an icon, or selecting the program through a menu option). When the user requires help, the user activates a button on the user interface to show the help content. The graphical window containing the application is partitioned to define a help pane which shows the help content. The help pane is integrated into and appears positioned adjacent to a workspace to assist the user with context specific, step-by-step, instructions. In this manner, the help is offered to the user without having to open a separate graphical window to show the help content.

The help pane is advantageous in comparison to traditional help windows because the help pane is part of the application window and cannot get lost behind other active windows or float annoyingly over the workspace. Additionally, when the help pane is activated, the focus is not shifted from the application to the help pane, but instead remains with the application. Accordingly, the user can perform the keystroke instructions provided by the help pane without having to remember to click the application window to return focus before proceeding.

BRIEF DESCRIPTION OF THE DRAWINGS

FIG. 4 shows the help pane integrated into a workspace.

DETAILED DESCRIPTION OF THE PREFERRED EMBODIMENT

Figure 1:
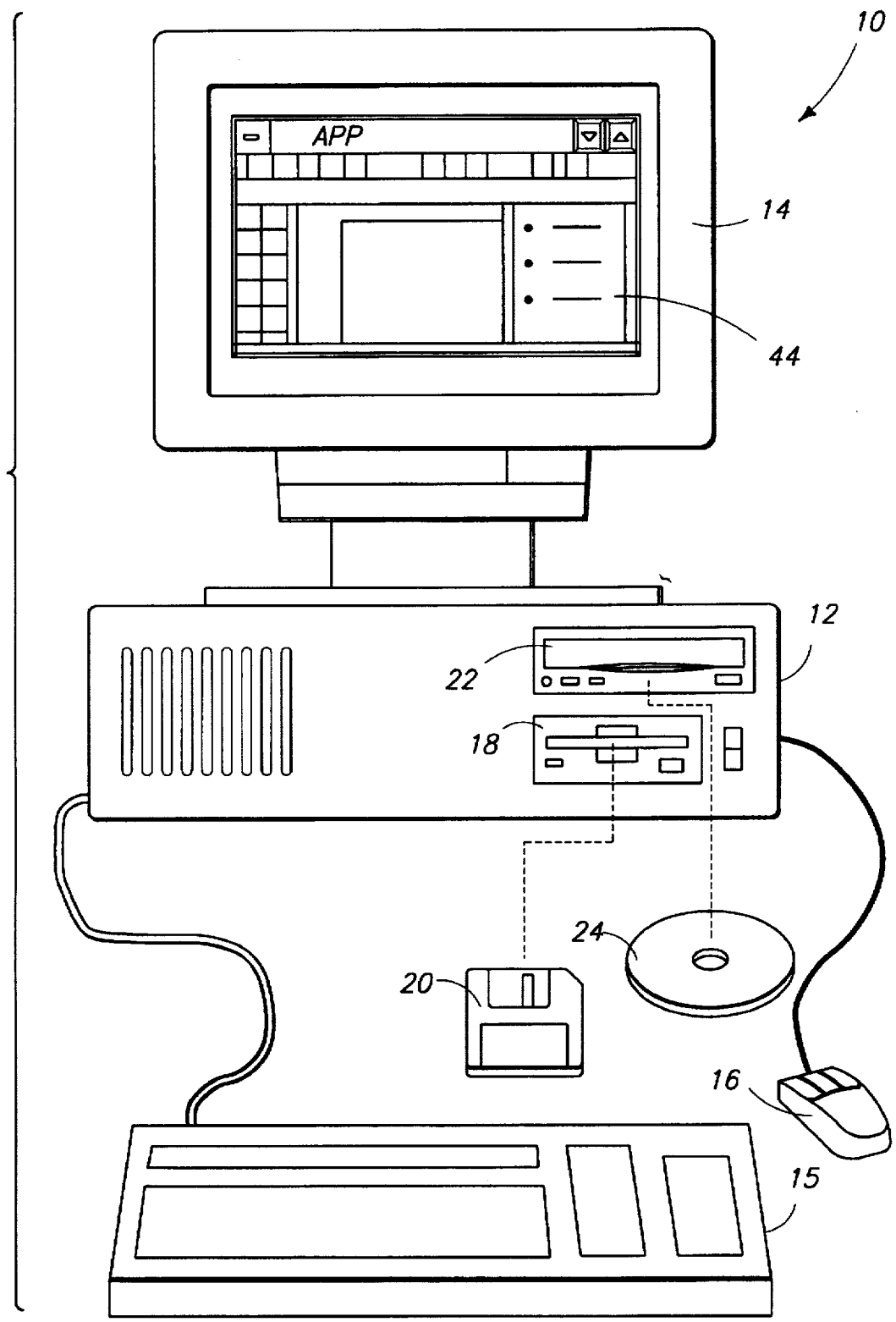
FIG. 1 is a diagrammatic illustration of a computer executing a computer application according to an example implementation of this invention.

FIG. 1 shows a computer 10 in the form of a conventional desktop IBM-compatible computer. The computer 10 has a central processing unit (CPU) 12, a display monitor 14, a keyboard 15, and a mouse 16. The computer 10 also has a floppy disk drive 18 for interfacing with a compatible floppy memory diskette 20 (e.g., 3.5" form factor), and an optical disk drive 22 for interfacing with a compatible CD-ROM 24. The computer 10 might also include another input device in addition to, or in lieu of, the keyboard 15 and mouse 16 including such devices as a track ball, stylus, or the like.

Figure 2:
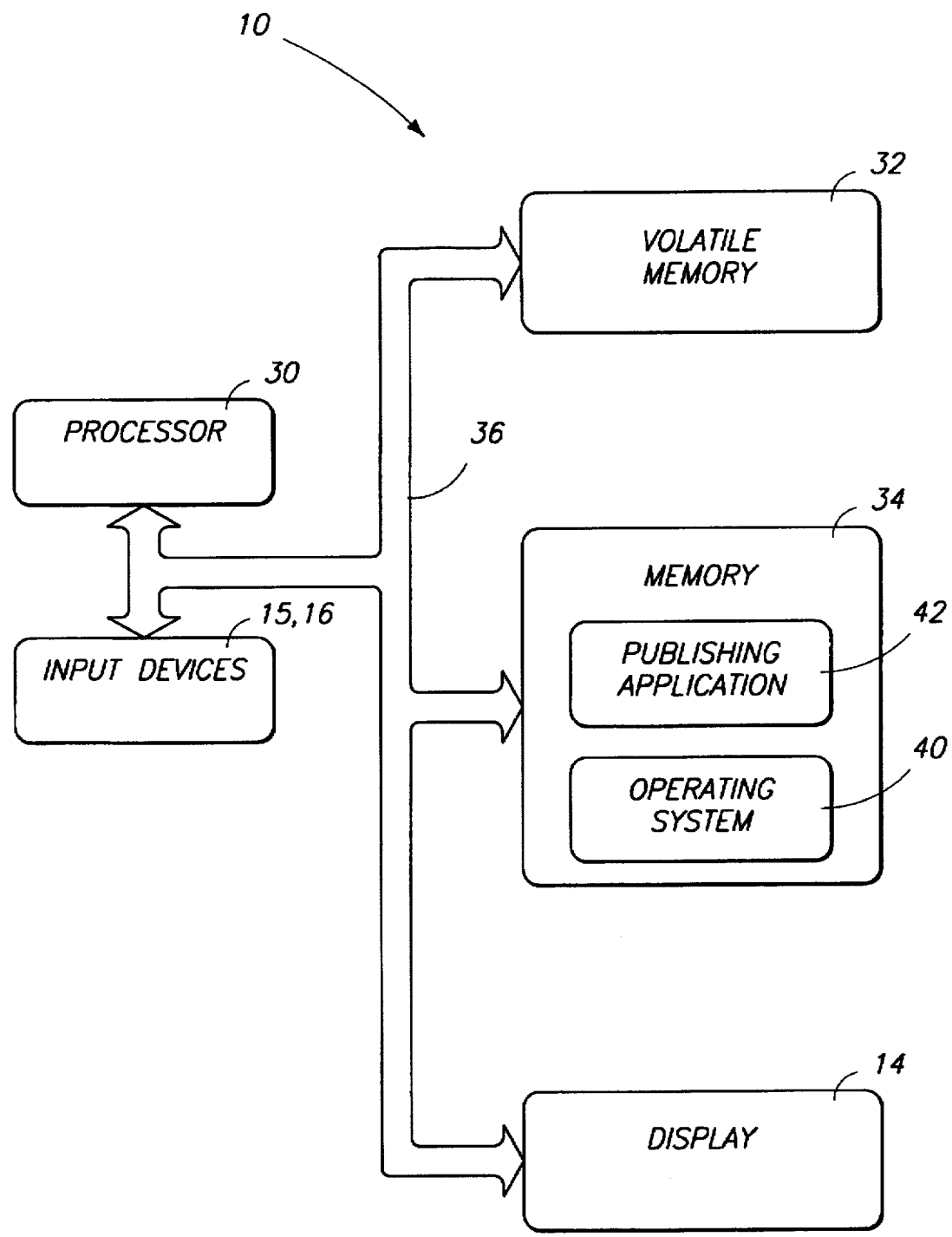
FIG. 2 is a block diagram of the FIG. 1 computer.

FIG. 2 shows a functional block diagram of the computer 10. The computer 10 has a processor 30, a volatile memory 32 (e.g., RAM), and a non-volatile memory 34 interconnected by an internal bus 36. The non-volatile memory 34 can be implemented as integrated circuit chips (e.g., ROM, EEPROM), disk drive(s) (e.g., floppy, optical, hard), or a combination. The display 14 is connected to the bus 36 through appropriate hardware interface drivers (not shown). Additionally, the input devices 15, 16 are connected to supply data to the bus 36 via appropriate I/O ports, such as serial RS232 ports.

The computer 10 runs an operating system 40 which supports multiple applications. The operating system 40 is stored on the non-volatile memory 34 and executes on the processor 30. The operating system is preferably a multi-tasking operating system which allows simultaneous execution of multiple applications, although aspects of this invention may be implemented using a single-tasking operating system. The operating system employs a graphical user interface windowing environment which presents the applications or documents in specially delineated areas of the display screen called "windows." Each window has its own adjustable boundaries which enable the user to enlarge or shrink the application or document relative to the display screen. Each window can act independently, including its own menu, toolbar, pointers, and other controls, as if it were a virtual display device. One preferred operating system is a Windows® brand operating system sold by Microsoft Corporation, such as Windows® 95 or Windows NT™ or other derivative versions of Windows®. However, other operating systems which provide windowing environments may be employed, such as the Macintosh OS from Apple Corporation and the OS/2 Presentation Manager from IBM.

A computer application 42 is stored in the non-volatile memory 34. When activated, the computer application 42 rims on the operating system 40 while executing on the processor 30. The application 42 can be loaded into the memory 34 from the floppy diskette 20 or CD-ROM 24, or alternatively, downloaded from a network via a network port (not shown). In this example, the computer program is a desktop publishing program. For instance, one suitable publishing program is sold under the name Publisher from Microsoft Corporation. However, the computer application can be essentially any application, including word processing programs, spreadsheet programs, database programs, and the like.

It is noted that the invention is described within the illustrated context of a familiar desktop computer, as shown in FIG. 1. An example computer includes a 386-equivalent microprocessor, or better, with four or more megabytes of RAM. This example computer is capable of running a multitasking operating system with a graphical user interface windowing environment. However, aspects of this invention might also be employed in other forms of computing devices, such as laptop computers, hand held computers, portable personal information managers (PIMs), and the like. In these devices, the application may be configured to run on a single-tasking operating system.

With reference again to FIG. 1, the user launches the application in a customary fashion by, for example, clicking on an icon or choosing the program from a menu. The graphical user interface of the spreadsheet application is displayed on the monitor 14 and bounded within a graphical window 44, as is customary in a graphical user interface windowing environment. The window 44 is associated with the publishing application, and is referred to as the "application window" or "publishing window."

Figure 3:
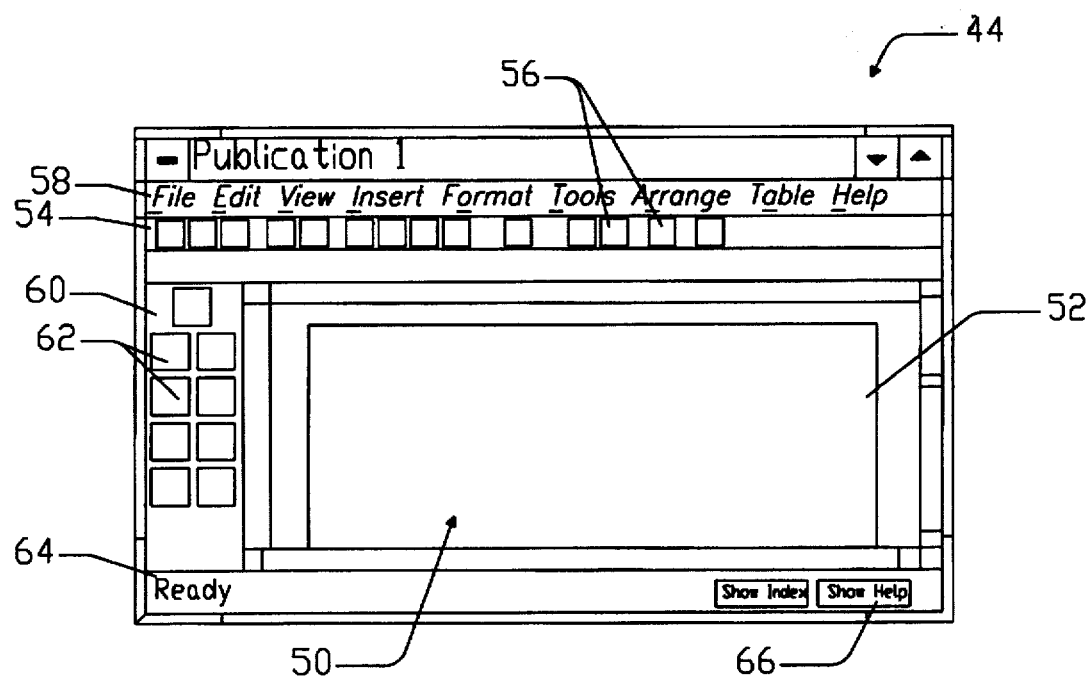
FIG. 3 is a diagrammatic illustration of a graphical user interface window of the computer application at an instance prior to activating a help pane.

FIG. 3 shows the application window 44 in more detail. For purposes of continuing discussion, the application is described in the context of the example desktop publishing application. The application window 44 includes a workspace 50 which contains the publication 52. In other computer applications, this workspace might hold a word processing document, a spreadsheet workbook, a database page, or other types of works.

The application window 44 has an upper toolbar 54 located above the workspace 50. The upper toolbar 54 has multiple controls in the form of soft buttons 56 which assist the user in performing routine tasks on the publication. For instance, the control buttons 56 might include a new document button, an open file button, a save button, a print button, a spell check button, a cut button, a copy button, a paste button, and so forth.

A menu bar 58 is positioned above the upper toolbar 54. The menu bar 58 has an assortment of drop-down menus labeled "File," "Edit," "View," "Insert," "Format," "Tools," "Arrange," "Table," and "Help." The author opens a drop-down menu associated with the label through common techniques, such as by clicking on the label with a mouse pointer, or by entering the key letter in the label with an "ALT+letter" operation on the keyboard.

The application window 44 has a side toolbar 60 which contains multiple publication control buttons 62. These control buttons are specific to the publication application. The side toolbar 60 is shown along the left hand side of the workspace 50, although it can be moved to other locations within the application window 44.

The application window 44 also has a status bar 64 situated beneath the workspace 50. The status bar 64 has a status description "Ready." The application user interface also supports a movable pointer or other indicator (not shown) which can be moved across the window 44. The author manipulates the pointer using a mouse or arrow keys on a keyboard.

The application is configured to provide help to a user during creation of the work. For instance, in the desktop publishing program, the user might be interested in creating a three-panel brochure. The publishing application is configured to provide help content in the way of step-by-step instructions for creating the brochure. The help content may also include an electronic version of the operation manual that might accompany the software product.

According to an aspect of this invention, the help content is provided in a help pane that is part of the graphical window 44. The help pane is accessed by a "Show Help" control button 66 in the status bar 64 of FIG. 3. Upon activation of the "Show Help" control button 66, the application window 44 is partitioned to define a help pane for showing the help content without opening a separate graphical window.

Figure 4:
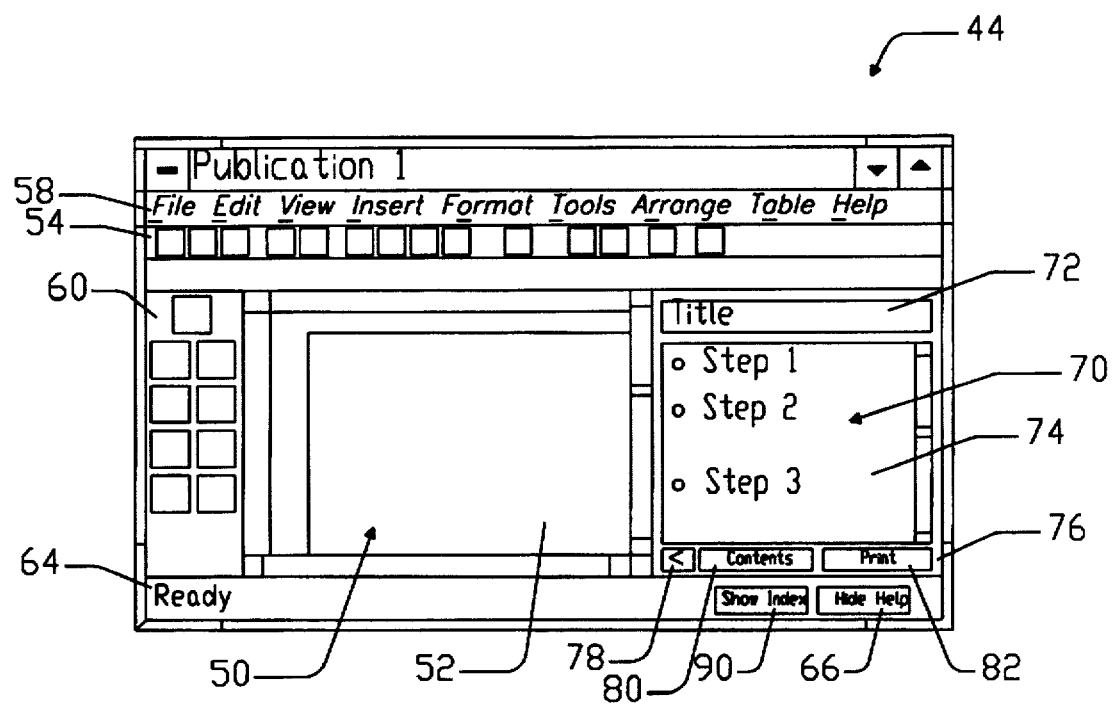
FIG. 4 is a diagrammatic illustration of a graphical user interface window of the computer application at an instance after activation of the help pane.

FIG. 4 shows a help pane 70 formed as part of the application window 44. In the illustrated implementation, the help pane 70 is integrated into and appears positioned beside the workspace 50 within the application window 44. The help pane 70 includes a top non-scrolling area 72 which contains a title of the help topic. The top non-scrolling area 72 automatically re-sizes to accommodate the font size of text in this region. When a title is longer and text wraps to fit the horizontal width, the area grows vertically to display the whole title.

The help pane 70 has a middle scrolling area 74 which shows the instructions of the help content. If the user has not received help during the current session, the help pane opens to a main table of contents. As the user begins to perform specific tasks, however, the middle scrolling area 74 of the help pane 70 presents text showing step-by-step instructions, as represented by the bullet steps 1–3. The instructions are preferably task-oriented which pertain directly to the specific task that the user is attempting to perform. In the brochure example, the instructions pertain to the steps of creating a three-panel brochure. If the instructions exceed the content space provided in the middle area 74, the instructions can be scrolled to view other portions of the instructions. The middle scrolling area 74 can also include buttons that jump to other topics or launch demonstrations.

The help pane 70 also includes a bottom non-scrolling area 76 which includes two navigation buttons 78 and 80. The navigation "<" button 78 enables the user to retrace their path to previous screens. The "Contents" button 80 provides a quick jump to the main table of contents for the help information. The bottom non-scrolling area 76 further includes a "Print" button 82 which prints the help topic that is currently displayed in the middle area 74.

Figure 5:
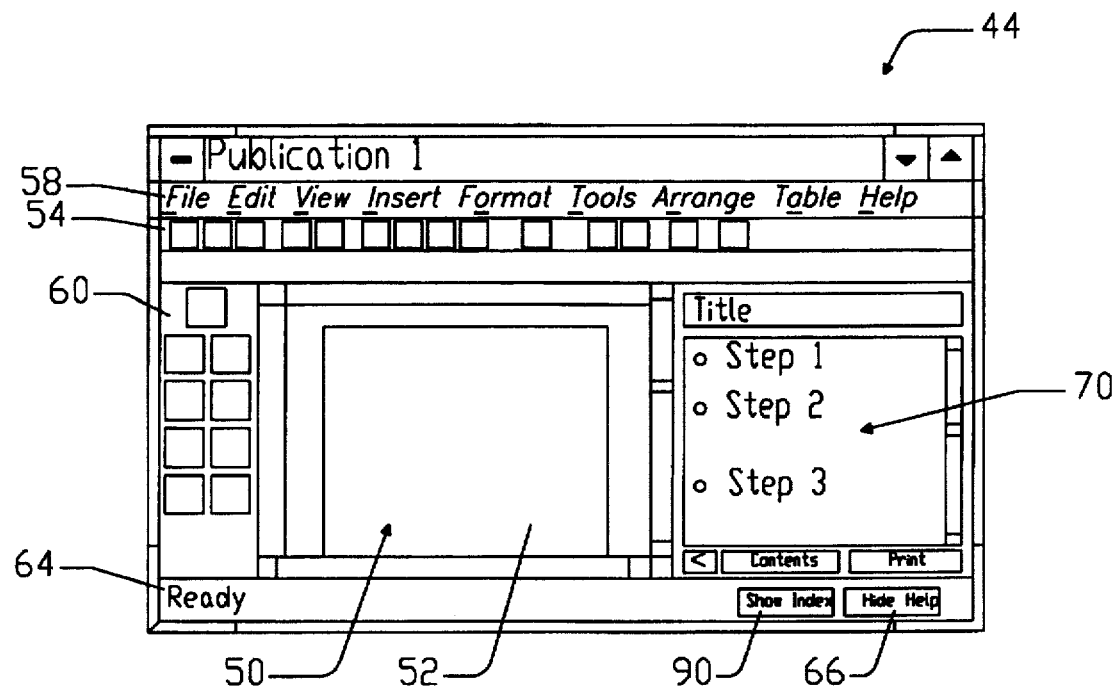
FIG. 5 is a diagrammatic illustration of a graphical user interface window of the computer application showing a re-sizing of a work within the workspace.

When the help pane 70 is displayed, it encroaches on the workspace 50 and may initially cover a portion of the publication 52. In the illustrated drawing, the help pane 70 covers almost one-half of the workspace 50. For normal size computer monitors, however, the help pane 70 covers a far less percentage of the workspace 50. To ensure that the entire publication can be viewed when the help pane 70 is displayed, the publication 52 is re-sized within the workspace 50. FIG. 5 shows the application window 44 with an active help pane 70 and the publication 52 re-sized within workspace 50 to be visible to the user.

When the help pane is active, the control button 66 changes its label from "Show Help" to "Hide Help" as illustrated in FIGS. 4 and 5. The user can close the help pane 70 by simply activating the "Hide Help" button 66, at which time the "Hide Help" label again toggles back to "Show Help."

The application is preferably configured to remember the present location within the help content that is shown when the user hides the help pane. For instance, suppose that the user is performing a rather long task that involves more steps than can be displayed in the middle scrolling area 74. Further, suppose the user has scrolled down the instructions to see steps presented farther down in the help content. If the user activates the "Hide Help" button 66 to close the help pane 70, the applications stores the present location of the help content. In the event that the user subsequently recalls the help pane 70 by activating the "Show Help" button 66, the application returns to the location within the help content that the user last left prior to the help pane being hidden.

The "Show Help" and "Hide Help" buttons greatly enhance usability of the help pane as the user can quickly and easily show and hide help without losing his/her place in the help dialog. As a result, users will be less hesitant to employ the help pane, as compared to their reluctance to use traditional help windows, because the user can call upon help when needed and safely hide it for immediate retrieval without fear of losing it.

Figure 6:
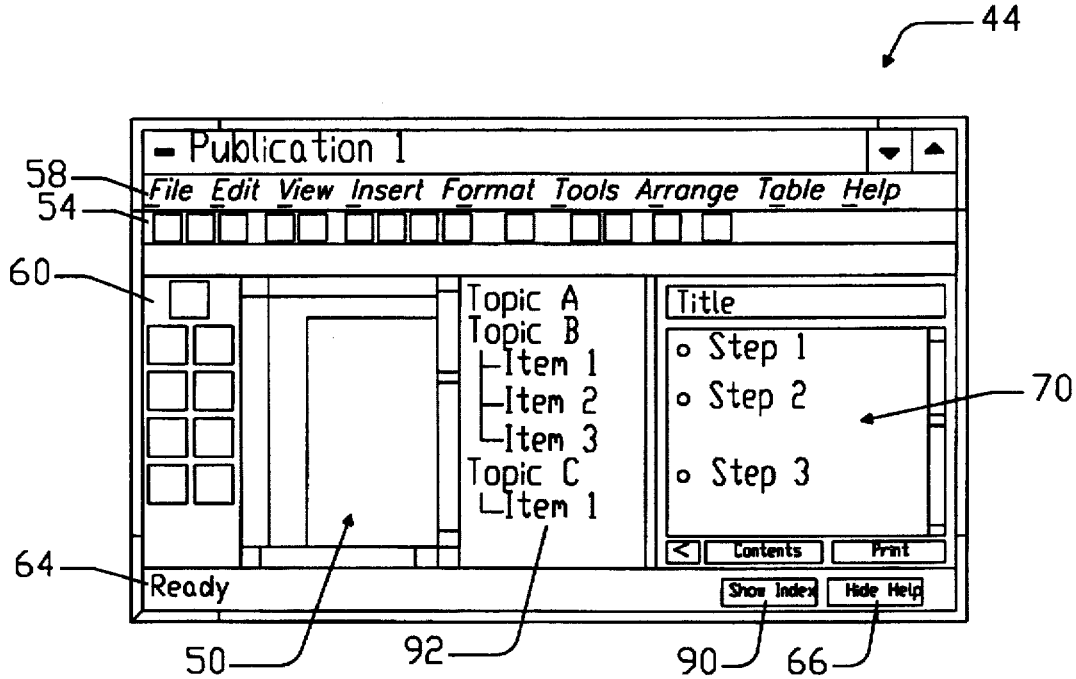
FIG. 6 is a diagrammatic illustration of a graphical user interface window of the computer application showing an expansion of the help pane to include an index to the help content.

As shown in FIG. 6, the help pane 70 can be used to show an index to the help content by activating a "Show Index" button 90 in the status bar 64. In this illustration, the help pane 70 is expanded to provide an index area 92 which shows the index to the help content. This index allows the user to easily switch to other related help topics. The index can also include an edit field (not shown) which allows a user to enter a topic and, based on that topic, show an index of topics most closely related to the entered topic. In another implementation, the index and help content can be organized as tabbed folders or the like within a static-size help pane. The user switches between the index and help content by selecting the appropriate tab.

Figure 7:
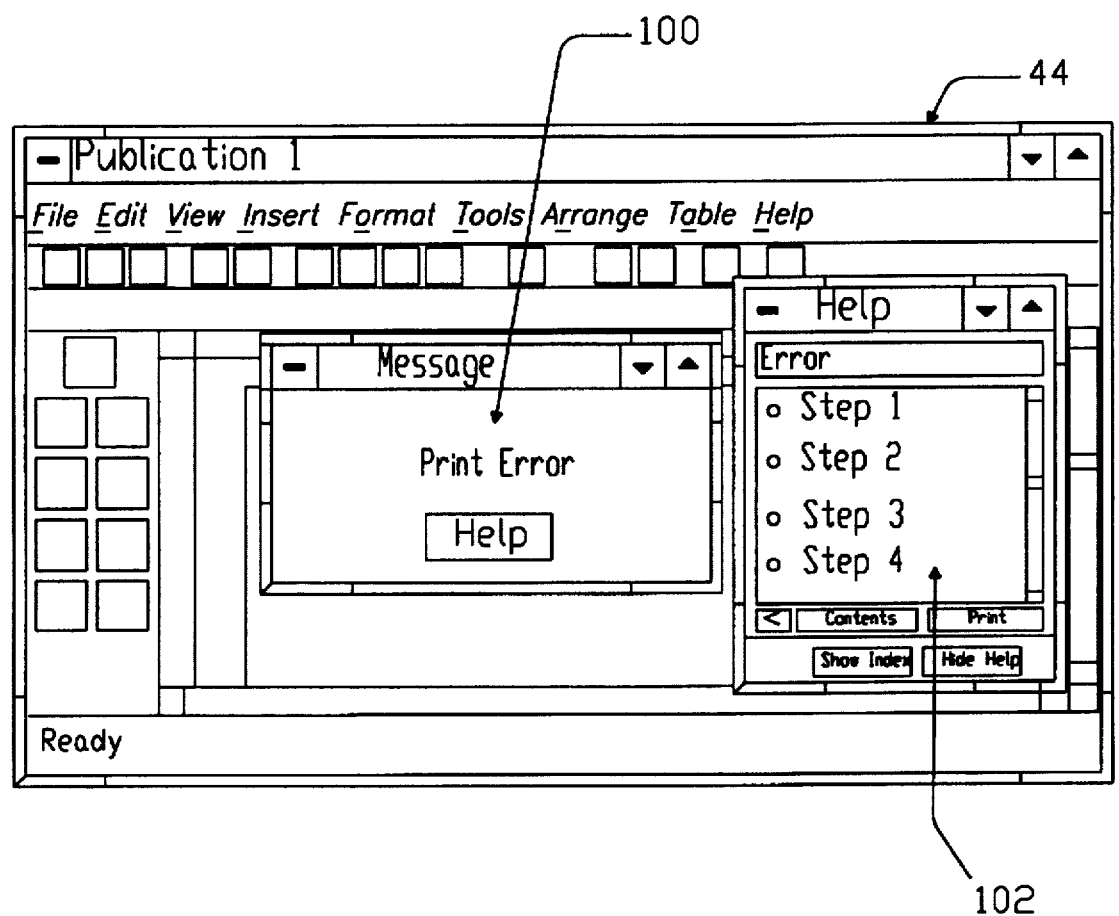
FIG. 7 is a diagrammatic illustration of a graphical user interface window of the computer application showing the help pane converted to a floating or undocked help window in response to a triggering event, such as the pop-up of a message or dialog box.

FIG. 7 shows another aspect of this invention concerning the impact of pop-up message or dialog boxes. These boxes are automatically displayed by the operating system or application. A message box contains a simple statement to inform the user of some interrupt or inability to complete a task. The message box might also ask a user to press a key, such as the "F1" key, to receive additional help. A dialog box provides information to the user and contains various options which solicit a response from the user. The dialog box might contain a "help" button that the user can activate to obtain more information regarding the message.

In the event that a dialog box or message box 100 opens while the application window 44 is active, focus is shifted to the dialog/message box 100 and the user interface for the application is temporarily disabled. To ensure that the user can still access help, the computer application is configured to convert the help pane to a separate graphical help window 102. From a user interface perspective, the help pane appears to automatically undock from its static location within the application window 44 and transform into a movable, self-contained graphical window. If help remained in a pane of the disabled application rather than being undocked to a separate window, the user would not be able to access help because the application user interface is temporarily disabled. Clicking on the application window is generally not permitted until the user has responded to the open dialog or message box. Accordingly, the temporary undocking of the help pane renders the help available to the user when responding to the dialog or message box.

The help window 102 is preferably made to float to remain visible to the user. If the user activates the help button in the dialog or message box, the help window 102 displays help content related to the event which triggered the interrupt. The help content may be entirely unrelated to the application from which the help window was undocked. After the user responds to the message or dialog box 100 and the pop-up box is closed, the help window 102 is converted back to a help pane 70 in the application window. It is noted that other triggering events, in addition to the message and dialog boxes, can be defined which cause the help pane to undock into an independent window.

Presenting helpful instructions to a user through a help pane has many advantages. Unlike prior art help windows, the help pane 70 is part of the active application window. As a result, the help pane cannot be lost behind the application window, nor does it float annoyingly over the workspace as traditional help windows. Another advantage is that the focus is not shifted from the application to the help pane 70, but instead remains with the application. Accordingly, the user can perform the keystroke instructions provided by the help pane 70 without having to remember to click the application window to return focus before proceeding.

Another advantage of the help pane is that users feel that the pane is part of the user interface presented by the application, as opposed to a separate window which "covers" their work. Accordingly, the users are more willing to have the help pane showing while performing their tasks, particularly when the work is re-sized to fit the work space, even though the help pane covers approximately the same screen area as a help window.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A computer-implemented method for executing a computer application in a graphical user interface windowing environment, comprising the following steps:

presenting a workspace within a graphical window; and displaying help content in a help pane as part of the graphical window without opening a separate graphical window to display the help content and without losing focus to the graphical window the help pane being displayed irrespective of pointer position.

2. A computer-implemented method as recited in claim 1, further comprising the step of positioning the help pane beside the workspace within the graphical window.

3. A computer-implemented method as recited in claim 1, further comprising the following steps:

displaying a work in the workspace; and re-sizing the work within the workspace when the help pane is displayed.

4. A computer-implemented method as recited in claim 1, further comprising the step of expanding the help pane to show an index to the help content.

5. A computer-implemented method as recited in claim 1, further comprising the step of selectively displaying and hiding the help pane.

6. A computer-implemented method as recited in claim 5, wherein the help content exceeds a content space of the help pane, further comprising the following steps:

displaying a portion of the help content in the help pane;

enabling a user to scroll through the help content to display other portions of the help content within the content space; and in the event that the help pane is hidden and subsequently displayed again, displaying the portion of the help content which was last displayed in the help pane prior to the help pane being hidden.

7. A computer-implemented method as recited in claim 1, further comprising the step of converting the help pane to a separate graphical window independent of the graphical window containing the application.

8. A computer-implemented publishing application executable on a processor to direct the processor to perform the steps of the computer-implemented method as recited in claim 1.

9. A computer programmed to perform the steps of the computer-implemented method as recited in claim 1.

10. A computer-readable memory which directs a computer to perform the steps in the computer-implemented method as recited in claim 1.

11. In a graphical window containing a computer application, a computer-implemented method for offering help content comprises the step of partitioning the graphical window to define a help pane for showing the help content without opening a separate graphical window to show the help content and without losing focus to the graphical window the help pane being displayed irrespective of pointer position.

12. A computer-implemented method as recited in claim 11, further comprising the following steps:

defining a workspace within the graphical window;

displaying a work in the workspace; and re-sizing the work within the workspace when the help pane is shown.

13. A computer-implemented method as recited in claim 11, further comprising the step of expanding the help pane to show an index to the help content.

14. A computer-implemented method as recited in claim 11, further comprising the step of selectively displaying and hiding the help pane.

15. A computer-implemented method as recited in claim 14, wherein the help content exceeds a content space of the help pane, further comprising the following steps:

displaying a portion of the help content in the help pane;

enabling a user to scroll through the help content to display other portions of the help content within the content space; and in the event that the help pane is hidden and subsequently displayed again, displaying the portion of the help content which was last displayed in the help pane prior to the help pane being hidden.

16. A computer-implemented method as recited in claim 11, further comprising the step of converting the help pane to a separate graphical window independent of the graphical window containing the application.

17. A computer-implemented publishing application executable on a processor to direct the processor to perform the steps of the computer-implemented method as recited in claim 11.

18. A computer programmed to perform the steps of the computer-implemented method as recited in claim 11.

19. A computer-readable memory which directs a computer to perform the steps in the computer-implemented method as recited in claim 11.

20. A computer-implemented method for executing a computer application in a graphical user interface windowing environment, comprising the following steps:

presenting the computer application in a graphical window;

displaying help content in a help pane as part of the graphical window without opening a separate graphical window to display the help content; and subsequently converting the help pane to a separate graphical window independent of the graphical window containing the application.

21. A computer-implemented method as recited in claim 20, further comprising the step of automatically converting the help pane to a separate graphical window upon occurrence of a triggering event.

22. A computer-implemented method as recited in claim 21, further comprising the step of altering the help content from content related to the application to content related to issues of the triggering event.

23. A computer-implemented method as recited in claim 20, further comprising the step of converting the help pane to a separate graphical window upon occurrence of a triggering event selected from a group of events comprising activation of a message box and activation of a dialog box.

24. A computer-implemented method as recited in claim 20, further comprising the step of changing the separate graphical window containing the help content back to a help pane of the graphical window containing the application.

25. A computer-implemented publishing application executable on a processor to direct the processor to perform the steps of the computer-implemented method as recited in claim 20.

26. A computer programmed to perform the steps of the computer-implemented method as recited in claim 20.

27. A computer-readable memory which directs a computer to perform the steps in the computer-implemented method as recited in claim 20.

28. A computing device comprising:

a processor;

a display;

an operating system executing on the processor which provides a graphical user interface environment capable of presenting at least one graphical window on the display and a pointer; and an application running on the operating system and being presented within an application window of the graphical user interface, the graphical application window having a help pane for showing help content without opening a separate graphical window to show the help content and without losing focus to the graphical window, the help pane being displayed irrespective of where the pointer is positioned.

29. A computing device as recited in claim 28, wherein the application is selected from a group of applications comprising a publishing application, a spreadsheet application, a word processing application, and a database application.

30. A computing device as recited in claim 28, wherein the application is configured to enable selective display and hiding of the help pane.

31. A computing device as recited in claim 28, wherein the graphical application window has a workspace and the help pane is arranged adjacent to the workspace.

32. A computing device as recited in claim 28, wherein:

the graphical application window has a workspace for containing a work; and the application being configured to enable selective displaying of the help pane and to re-size the work within the workspace when the help pane is displayed.

33. A computing device as recited in claim 28, wherein the application is configured to expand the help pane to show an index to the help content.

34. A computing device as recited in claim 28, wherein the application is configured to convert the help pane to a separate graphical window independent of the graphical application window.

* * * * *